United States Patent [19]

Hettinga

[11] Patent Number: 4,931,236
[45] Date of Patent: Jun. 5, 1990

[54] METHOD FOR FORMING IRRIGATION PIPE HAVING A POROUS SIDE WALL

[76] Inventor: Seibolt Hettinga, 2123 N.W. 111th St., Des Moines, Iowa 50322

[21] Appl. No.: 321,733

[22] Filed: Mar. 10, 1989

[51] Int. Cl.$^5$ ............................................. B29C 47/20
[52] U.S. Cl. ........................................ 264/41; 264/48; 264/50; 264/209.1; 264/321; 425/4 C; 425/326.1
[58] Field of Search ............. 264/50, 48, 321, 45.9, 264/209.1, 209.5, 209.9, 209.8, 41; 425/380, 467, 4 C, 326.1, 817 C, 379.1, 378.1, 72.1

[56] References Cited

U.S. PATENT DOCUMENTS

| | | | |
|---|---|---|---|
| 2,807,505 | 9/1957 | Weitzel | 264/209.1 |
| 2,912,041 | 11/1959 | Boggs | 425/380 |
| 3,060,512 | 10/1962 | Martin et al. | 425/379.1 |
| 3,230,902 | 1/1966 | Grimm et al. | 425/380 |
| 3,466,705 | 9/1969 | Richie | 425/380 |
| 3,558,753 | 1/1971 | Edlin | 425/379.1 |
| 4,028,288 | 6/1977 | Turner | 264/109 |
| 4,110,420 | 8/1978 | Turner | 264/45.3 |

*Primary Examiner*—Jeffery Thurlow
*Attorney, Agent, or Firm*—Rudolph L. Lowell

[57] ABSTRACT

The method of forming a porous pipe including extruding in a plasticized state two particulate incompatible resins, one of which is a thermosetting resin and the other a thermoplastic resin, and passing a gas through the wall of the extruding pipe and into the atmosphere to form a maze of gas passages between the particles of the incompatible resins.

3 Claims, 2 Drawing Sheets

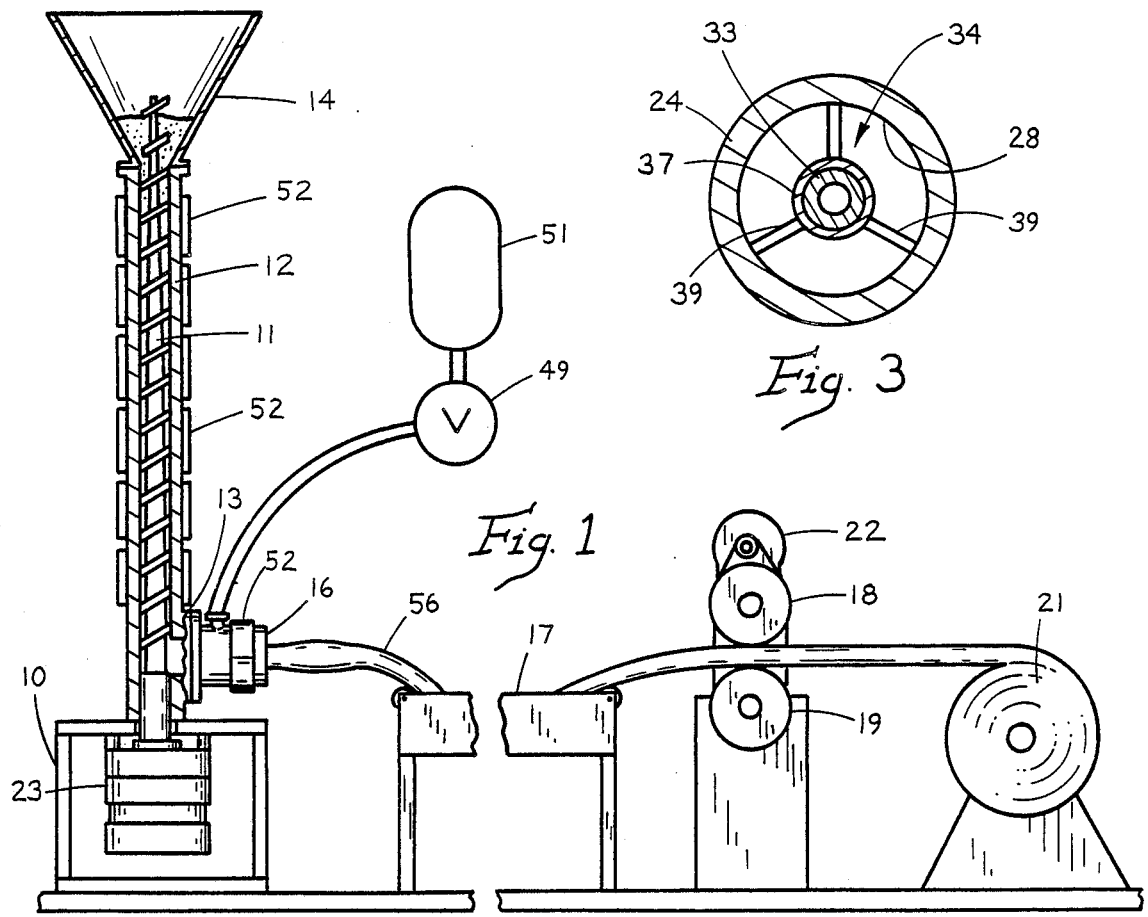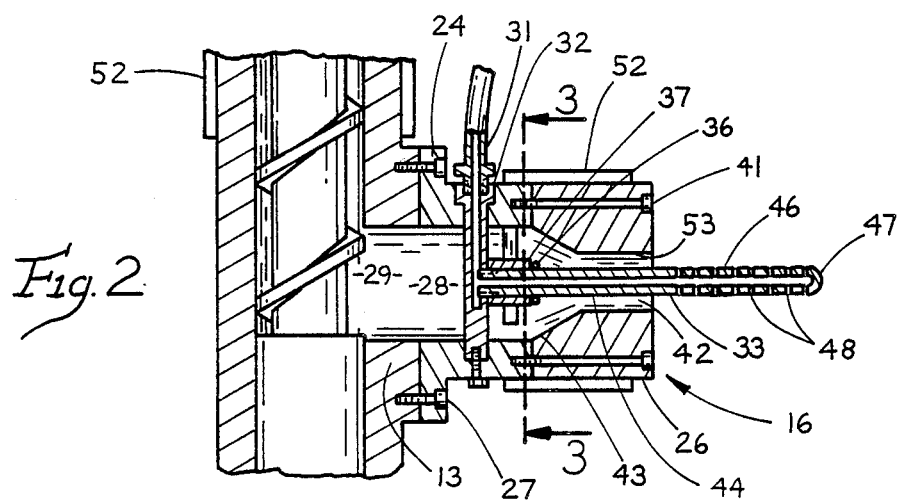

METHOD FOR FORMING IRRIGATION PIPE HAVING A POROUS SIDE WALL

This invention relates to the manufacture of a porous pipe or conduit for use in irrigation systems and, in particular, to the method of extruding porous pipe formed of two incompatible thermal plastic and thermal setting resins wherein a maze of passages are formed in the side wall of the pipe by forcing a gas therethrough between the particles of the incompatible materials as the pipe is being extruded.

BACKGROUND OF THE INVENTION

Porous pipe for underground irrigation systems eliminates the need for sprinkler heads and the resultant objections thereto in the manipulation of lawn care equipment such as mowing, aerating and shut-down time when in use. With a porous pipe irrigation system, water is delivered directly to the root area of plants and can be applied at any time in amounts determined by the degree of porosity in the pipe. A method of forming extruded porous pipe for this general purpose is disclosed in U.S. Pat. No. 4,110,420 wherein the pipe is formed of reclaimed particle sized rubber material mixed with polyethylene, with the flow passages in the pipe wall being the result of foaming with steam and gases released from the mixture and primarily from the reclaimed rubber. The degree of porosity is dependent upon the properties of the reclaimed rubber in the initial mix. By virtue of the particalized reclaimed rubber material, it is necessary to initially screen the material to size and then use relatively high extruding pressures of 2,000 to 3,500 psi at temperatures, during extrusion, varying between 300° and 400° F. to plasticize the polyethylene to a fluid plastic state while retaining the integrity of the prevulcanized reclaimed rubber material.

SUMMARY OF THE INVENTION

The method of this invention extrudes a porous irrigation pipe at a material mix temperature of about 450° F. and an extruding pressure of about 600 psi. The mix comprises two incompatible materials of a thermoplastic resin and a thermosetting resin. The material mix is heated until plasticized and then extruded about a tubular mandrel. The mandrel forms part of a gas supply tube and has a discharge portion arranged outwardly of the extruder head for discharging gas radially therefrom and through the pipe side wall to form a maze of air passages between the incompatible mix materials. The discharged gas provides an air cushion about the gas discharge portion of the mandrel which acts to reduce the extruding pressure on the pipe without impairing the pipe shape within tolerance requirements. The porosity of the pipe is varied by increasing the weight ratio of the thermoplastic resin to the thermosetting resin in the mixture being fed to the extruder.

DESCRIPTION OF THE DRAWINGS

FIG. 1 is a side elevational view of the extruding machine of this invention with parts shown in section for the purpose of clarity;

FIG. 2 is an enlarged longitudinal sectional detail view of the extruder head shown in FIG. 1;

FIG. 3 is an enlarged sectional view taken on line 3—3 in FIG. 2;

DESCRIPTION OF A PREFERRED EMBODIMENT

Figure 4:
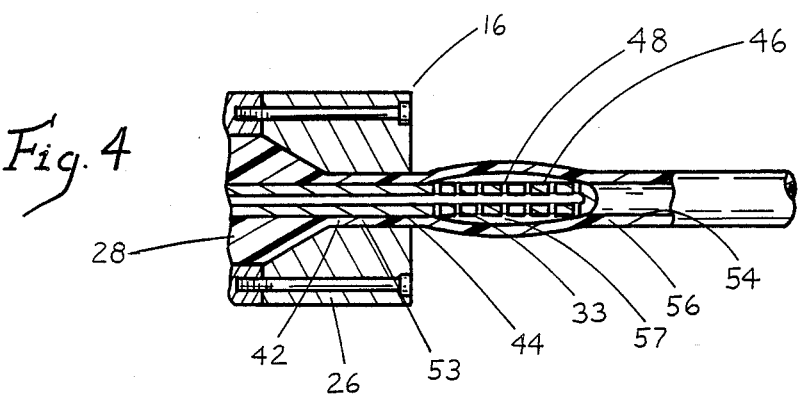
FIG. 4 is a sectional view of the extruder head of FIG. 2 showing extrusion of the pipe being formed.

With reference to FIG. 1 of the drawings, the pipe extruding machine of this invention is shown as including a frame 10, and an upright extruder screw 11 mounted for rotation within a housing 12 that has a laterally extended outlet 13 adjacent its lower end. A material feed hopper 14 is mounted at the upper end of the housing 12 for supplying a material mix directly to the screw 11, with a die head 16 being mounted in operative association with the housing outlet 13. The pipe extruded from the die head 16 is passed through an elongated cooling tank 17 from which it is drawn by rollers 18 and 19 for winding about a conventional reel-type pipe coiler 21. The roller 18 is driven by a motor 22 and a motor 23, for rotating the screw 11, is mounted on the frame 10 in axial alignment with the screw.

The die head 16 (FIG. 2) includes a mounting member 24 for an extruder die 26. The mounting member 24 is secured by screws 27 to the housing outlet 13 with a central bore 28 therein axially aligned with the bore 29 of the outlet 13. As shown in FIG. 2, the bores 28 and 29 are of equal diameter. A supply tube 31 for supplying a gas or air to the die head 16 includes a lateral section 32 positioned transversely of the mounting member 24 to which is secured a longitudinal section or mandrel 33, that extends axially of the bore 28 and projects outwardly therefrom.

A bearing support 34 (FIG. 3) for the inner end of the mandrel 33 includes a hub portion 37 for receiving the mandrel 33 that has spokes or vanes 39, illustrated as three in number, receivable within the axial bore 28 of the mounting member 24. The inner end of the mandrel 33 is positioned within the hub portion 37 and extends therethrough for threadable attachment to the lateral tube section 32 to an extent limited by the engagement of a stop collar 36 on the mandrel with the hub portion 37. It is seen, therefore, that the threadable attachment of the section 32 with the mandrel functions to clamp the bearing support 34 against the lateral tube section 32.

As shown in FIG. 2, the extruder die 26 is secured to the mounting member 24 by screws 41 and has a central bore 42 in axial alignment with the bore 28 of the mounting member 24. The bore 42 is of a generally funnel shape in longitudinal section with the flared inner end 43 thereof having a diameter equal to the diameter of the bore 28 in the mounting member 24 and a stem section 44 thereof having a diameter of a size to receive the mandrel 33 in a concentrically spaced relation. The mandrel 33 has a gas discharge section 46 projected outwardly of the extruder die 26 formed with a closed terminal end 47. The discharge section 46, outwardly of the die head, has a series of rows of axially spaced radially extended discharge passages 48 for a purpose to appear later. The discharge of gas through the passages 48 is under the control of a valve 49 (FIG. 1) for a pressurized gas supply tank 51.

The product mix is fed into the hopper 14 (FIG. 1) for direct admission to the action of the extruder screw 11. As the mix travels through the housing 12, it is heated to a plasticizing temperature of not less than about 450° Fahrenheit by electric heating coils 52 mounted about the housing over the full length thereof and about the die head 16. The material mix is comprised of a mixture of two particulate non-bonding incompatible materials, with one of such materials consisting of thermoplastic resins such as polypropylene resins and polyvinyl chlorides, and the other of such materials comprising thermosetting resins such as, thermosetting rubber and phenolic resins. These types of resins have the characteristics of retaining incompatibility upon being heated to a plasticizing temperature of about 450° Fahrenheit.

The plasticized mixture is discharged by the extruder screw 11 through the outlet 13 and into the die head 16. On travel from the bore 28 into the bore 42 of the extruder die 26, the plasticized mix is confined within the annular space 53 defined by the inner peripheral surface of the stem portion 44 of the bore 42 and the outer peripheral surface of the mandrel 33 to form the wall 54 of the porous pipe 56 (FIG. 4).

Figure 6:
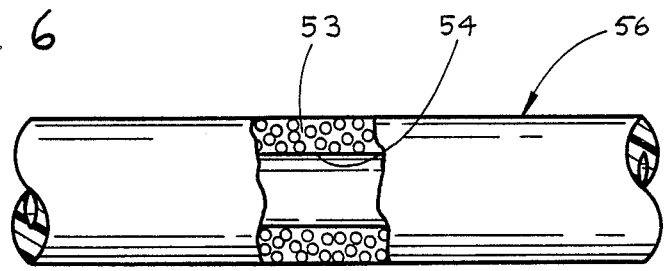
FIG. 6 is an enlarged section of the pipe formed with the die of FIG. 4 with a part broken away to show the maze of air passages in the side wall thereof.

As the extruded pipe 56 passes over the discharge section 46 of the mandrel 33, it is subjected to the discharge of gas or air directed radially outwardly from the passages 48, with the gas or air being collectively referred to hereinafter as gas. The gas acts to form a cushion 57 between the pipe wall 54 and the mandrel to temporarily move the wall out of contact with the mandrel. The forming of the gas cushion 57 functions to reduce the extruding pressure about the mandrel 33 concurrently with forming a chamber providing for the flow of gas into the pipe wall 54 and between the incompatible plastic materials to form a plurality or maze of passages extended radially through the pipe wall forming a porous texture (FIG. 6). On passing over the discharge portion 46 of the mandrel 33, the pipe wall contracts inwardly to the outer diameter of the mandrel to retain the dimensional tolerances predetermined in the extruder die 26.

The pipe 56 (FIG. 1) is drawn from the extruder die 26 and through the cooler tank 17 by the rollers 18 and 19 for wrapping into a coil at 21. The material mix supplied to the hopper 14 may consist by weight of 60 to 80 percent of the thermosetting resin relative to the weight of 40 to 20 percent, respectively, of the thermoplastic resin. Increasing the weight proportion of thermosetting resin to the thermoplastic resin results in an increase in the porosity of the pipe wall 54. The gas applied under pressure from the tank 51 may be pentane, Freon, carbon dioxide, nitrogen, or compressed air. Nitrogen has the characteristic of producing a chilling effect on the pipe wall 54 greater than the chilling action of the remaining gases. The chilling effect tends to induce the shrinking of the materials in the mix and thus acts to maintain the incompatibility of the materials in the mix whereby to assist the flow of gas discharged from the mandrel 33 through the mix and into the atmosphere to form gas passages in the pipe wall 54.

Figure 5:
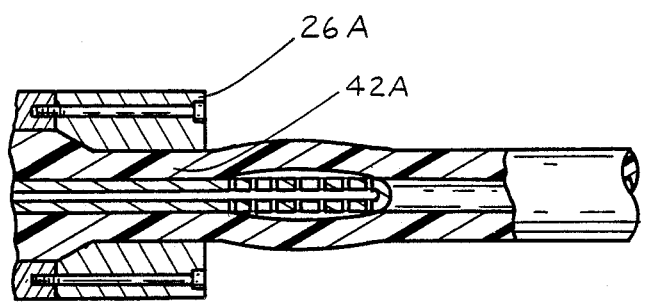
FIG. 5 is illustrated similarly to FIG. 4 and shows an extruder die for forming pipe of a greater wall thickness than the pipe formed by the extruder die of FIG. 4.
Figure 7:
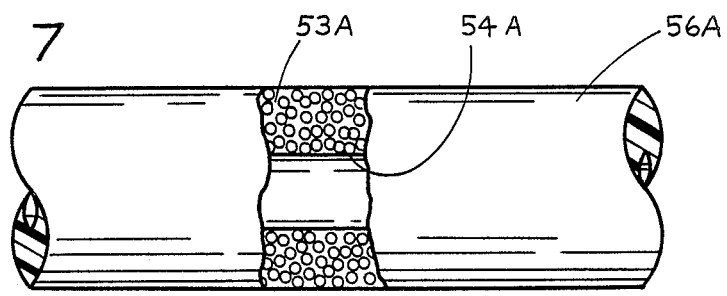
FIG. 7 is an enlarged section of the pipe formed with the die of FIG. 5 with a part broken away to show the maze of air passages in the side wall thereof.

The wall 54 of the pipe 56 may be varied in thickness with respect to a constant inner diameter determined by the mandrel 33 by changing the extruder die 26 in the machine. As illustrated for the extruder die 26 in FIG. 4, the pipe 56, shown enlarged in FIG. 6, has a relatively thinner wall 54 than the wall 54(a) for the enlarged pipe section 56(a) of FIG. 7 produced by the die head 26(a) of FIG. 5 wherein the bore 42a is of an increased diameter relative to the bore 42 of the extruder die 26.

Although the invention has been described with respect to a preferred embodiment thereof, it is not to be so limited since changes and modifications can be made therein which are within the full intended scope of the invention as defined in the appended claims.

I claim:
1. The method of forming a porous plastic pipe comprising the steps of:
   (a) mixing together two particulate incompatible plastic materials comprising a thermoplastic resin and a thermosetting resin having non-bonding composition characteristics,
   (b) feeding said mixture into a heated extruding unit having a die head with a bore therein,
   (c) extruding the pipe under a pressure of not less than about 600 p.s.i. and a temperature of not less than about 450° Fahrenheit,
   (d) providing a gas supply tube with a section within said extruding unit extended axially of and projected outwardly from said bore to form an annular discharge outlet between the outer peripheral surface of said tube section and the inner peripheral surface of said bore defining the sidewall of the pipe,
   (e) forming the outwardly projected portion of said section with a closed terminal end and a plurality of radially extended gas outlet passages, and
   (f) supplying a nitrogen gas under pressure to said supply tube for discharge through said outlet passages to induce chilling of the thermoplastic and thermosetting resins in the mix to assist the flow of said nitrogen gas radially through the extruded pipe sidewall and into the atmosphere to form a maze of gas passages in said sidewall between the particles of said incompatible materials.

2. The method of claim 1, wherein the mixture of incompatible materials consists of:
   (a) mixing by weight 60% to 80% of a thermosetting resin with 40% to 20%, respectively, of a thermoplastic resin.

3. The method of claim 1, including the steps of:
   (a) heating the mixture in the extruding unit to an extruding temperature slightly higher than the melt temperature of that one of the incompatible materials having the highest plasticizing temperature, and
   (b) cooling the extruded pipe to a temperature below the temperature of deformation of that one of the incompatible materials having the lowest deformation temperature.

* * * * *